(12) United States Patent
Takenobu et al.

(10) Patent No.: US 8,016,588 B2
(45) Date of Patent: Sep. 13, 2011

(54) INJECTION MOLDING MACHINE

(75) Inventors: Hideya Takenobu, Akashi (JP); Haruhiko Nakano, Akashi (JP)

(73) Assignee: Toyo Machinery & Metal Co., Ltd., Akashi-shi, Hyogo (JP)

( * ) Notice: Subject to any disclaimer, the term of this patent is extended or adjusted under 35 U.S.C. 154(b) by 201 days.

(21) Appl. No.: 12/374,119

(22) PCT Filed: Aug. 21, 2007

(86) PCT No.: PCT/JP2007/066151
§ 371 (c)(1),
(2), (4) Date: Jan. 16, 2009

(87) PCT Pub. No.: WO2008/032533
PCT Pub. Date: Mar. 20, 2008

(65) Prior Publication Data
US 2009/0169671 A1    Jul. 2, 2009

(30) Foreign Application Priority Data
Sep. 12, 2006   (JP) .................................. 2006-247351

(51) Int. Cl.
*B29C 45/38* (2006.01)
(52) U.S. Cl. ......... 425/566; 264/336; 425/571; 425/810
(58) Field of Classification Search .................. 264/334, 264/336; 425/556, 562, 566, 568, 571, 810
See application file for complete search history.

(56) References Cited

U.S. PATENT DOCUMENTS

| | | | |
|---|---|---|---|
| 3,989,436 A * | 11/1976 | McNeely et al. ............. 425/572 |
| 4,372,741 A * | 2/1983 | Cane et al. ..................... 425/556 |
| 4,391,579 A | 7/1983 | Morrison |
| 4,618,466 A * | 10/1986 | McGlashen et al. ......... 264/40.6 |
| 4,979,891 A * | 12/1990 | Kitamura ....................... 425/437 |
| 5,098,281 A * | 3/1992 | Kitamura ....................... 425/553 |
| 5,423,672 A * | 6/1995 | Gordon ......................... 425/564 |

(Continued)

FOREIGN PATENT DOCUMENTS

JP          58-057929 A       4/1983

(Continued)

OTHER PUBLICATIONS

International Search Report of PCT/JP2007/066151, Mailing Date of Nov. 20, 2007.

*Primary Examiner* — Yogendra N Gupta
*Assistant Examiner* — Emmanuel S Luk
(74) *Attorney, Agent, or Firm* — Westerman, Hattori, Daniels & Adrian, LLP

(57) ABSTRACT

An injection molding machine is provided which prevents, when molding a molding product, a molded part not to be used as a product to be integrally molded together with a molding product to be a product from being uselessly produced and improves production efficiency.
A nozzle receiving section 37 configured on a fixed mold 22 side of a cavity C formed of the fixed mold 22 and a movable mold 21 is made to slightly protrude to allow melted resin remaining at the ends of the nozzle receiving section 37 and nozzle 20 to be used as part of a molding product in the next molding cycle and it is thereby possible to prevent, when molding a thin flat molding product such as a compact disk and video disk, melted resin from being uselessly produced as a sprue.

2 Claims, 6 Drawing Sheets

U.S. PATENT DOCUMENTS

| | | | |
|---|---|---|---|
| 5,472,334 A * | 12/1995 | Takahashi | 425/554 |
| 5,648,105 A * | 7/1997 | Shimazu et al. | 425/139 |
| 5,690,974 A | 11/1997 | Miyairi | |
| 5,868,978 A * | 2/1999 | Kadoriku et al. | 264/40.5 |
| 6,382,955 B1 * | 5/2002 | Sandstrom | 425/542 |
| 7,270,535 B2 * | 9/2007 | Inada et al. | 425/552 |
| 7,311,516 B2 * | 12/2007 | Inoue | 425/542 |
| 2004/0096540 A1 * | 5/2004 | Nakano et al. | 425/554 |
| 2005/0140034 A1 * | 6/2005 | Ishikawa | 264/1.33 |
| 2005/0220925 A1 * | 10/2005 | Inada et al. | 425/408 |
| 2005/0220928 A1 * | 10/2005 | Inada et al. | 425/542 |
| 2006/0051552 A1 * | 3/2006 | Inada et al. | 428/64.1 |
| 2006/0188600 A1 * | 8/2006 | Inoue | 425/542 |
| 2007/0298137 A1 * | 12/2007 | Inoue | 425/149 |

FOREIGN PATENT DOCUMENTS

| | | |
|---|---|---|
| JP | 08-281714 A | 10/1996 |
| JP | 2003-053786 A | 2/2003 |

* cited by examiner

INJECTION MOLDING MACHINE

FIELD OF THE INVENTION

The present invention relates to an injection molding machine that molds a molding product using a mold, and more particularly, to an injection molding machine intended to improve molding efficiency when a molding product is molded without forming any sprue together with the molding to be a product.

BACKGROUND ART

A conventional common injection molding machine molds a molding product by sending granular thermoplastic resin, which is a raw material, into a heating cylinder, sending out resin using a screw provided inside the heating cylinder and movable forward/backward, to a nozzle at an end of the screw while melting the resin, causing the melted resin to be injected from the nozzle provided at the end of the screw into a cavity of a mold, causing the melted resin to cool and solidify in the cavity, then opening the mold and removing a molded product stuck to the mold from the mold using a protruding pin or the like.

Such an injection molding machine for molding a molding product such as plastics is generally constructed of a mold clamping unit and an injection unit, and the mold clamping unit is generally provided with a mold including a fixed mold and a movable mold, the movable mold is made to move forward/backward to/from the fixed mold through movable means capable of mold clamping such as a toggle mechanism or straight hydraulic scheme and the mold is thereby closed or opened during mold clamping.

An injection unit is used when pellet, which is granular resin is supplied as melted resin into the cavity formed during mold clamping of the aforementioned mold, and this injection unit is provided with drive means such as a motor as the drive source, the torque of the motor is sequentially transmitted via a pulley, belt or the like, the screw in the heating cylinder is rotated by a ball screw mechanism that converts rotary motion to linear motion, the melted resin is thereby transferred, and the melted resin is then injected from the nozzle into the cavity between the molds provided in the mold clamping unit.

Furthermore, Patent Document 1 discloses a runner-less mold that provides a recessed part in the center of a fixed mold, which is one of the fixed mold and a movable mold that make up a cavity, provides a compression core that engages with this recessed part in the center of the movable mold in a manner movable forward/backward, causes an end of a hot nozzle inserted in the fixed mold to protrude in the center of the recessed part, forms a runner section that is opened/closed by the compression core between the recessed part and compression core and leaves a resin layer in the recessed part when the compression core moves forward.

[Patent Document 1] Japanese Patent Laid-Open No. 8-281714

DISCLOSURE OF THE INVENTION

Problems to be Solved by the Invention

According to Patent Document 1, when the compression core moves forward in molding after the resin layer is left in the recessed part, since resin remaining in the recessed part is concave shaped in the recessed part and the thickness of the resin layer is approximately ½ of the thickness of the molded product (see FIG. 4 in Patent Document 1), relatively thick resin layers are inevitably left in the recessed part and the remaining resin layers are stacked every time molding is performed and the thickness of the resin layer changes. That the thickness of the resin layer changes means that the size of the gate also changes, which may adversely influence molding quality.

Furthermore, when a molding product of small thickness such as a compact disk and video disk, which is a recording medium into which music, video data or the like is recorded, is molded using the aforementioned injection molding machine, a sprue is molded linked with the molding product to be a product. This sprue is separated from the molding product to be a product in the mold during injection molding, the molding product and sprue are ejected from the mold using an ejection apparatus after mold opening, and therefore the work of removing the sprue from the molding product to be a product requires time and the removed sprue is not used as a product, and this results in useless production leading to an increase of production cost.

The present invention is intended to solve the above described problems and it is an object of the present invention to provide an injection molding machine designed to improve quality of a molded molding product, prevent molded parts which are not used as a product to be molded from being uselessly produced together with the molding product to be a product and thereby improve production efficiency.

Means for Solving the Problems

The injection molding machine according to aspect 1 is configured to provide a nozzle receiving section configured on a fixed mold side of a cavity formed of the fixed mold and a movable mold so as to slightly protrude toward the movable mold, a core section facing the nozzle receiving section in the movable mold in a manner movable forward/backward, an end of the nozzle being placed on substantially the same plane as that of an end of the nozzle receiving section, and a protruding part at a position of the core section facing the end of the nozzle that injects melted resin, wherein a gate of the resin injected into the cavity is cut by moving the core section forward and moving backward the nozzle receiving section and the nozzle pressed by the core section which has been moved forward so that the gate cutting causes a film of the resin to remain at the ends of the nozzle receiving section and the nozzle.

In the above described configuration, the melted resin injected from the nozzle is filled from the gate into the cavity, and when the core section moves forward, the forward movement of the core section causes the nozzle receiving section and nozzle to be pressed and move backward, gate cutting is performed, and then the movable mold moves backward and mold opening is performed. In this case, resin existing between the core section, nozzle receiving section and nozzle is cooled and solidified, united with resin filling the interior of the nozzle, thereby remains in a film shape at the end of the nozzle receiving section and nozzle, and therefore by melting the remaining resin when filling resin into the cavity in the next cycle with heat from the melted resin supplied from the nozzle or the like and using the resin as resin to be filled into the cavity, it is possible to use the resin as part of a molding product molded in the next molding cycle. Furthermore, since the protruding part is provided at the position of the core section facing the end of the nozzle which injects melted resin, the protruding part enters the nozzle at the end thereof and makes it possible to reduce cold slug that remains inside the nozzle at the end thereof which may cause molding defect (appearance defect).

The injection molding machine according to aspect 2 is the injection molding machine according to aspect 1, wherein the nozzle is provided with a heater.

In the above described configuration, when the solidified, remaining film-shaped melted resin is filled into the cavity, the film-shaped resin is heated and melted using the heater provided for the nozzle, and it is thereby possible to fill the film-shaped melted resin together with the melted resin supplied from the nozzle into the cavity.

Advantage(s) of the Invention

The injection molding machine according to aspect 1 is configured to provide a nozzle receiving section configured on a fixed mold side of a cavity formed of the fixed mold and a movable mold so as to slightly protrude toward the movable mold, a core section facing the nozzle receiving section in the movable mold in a manner movable forward/backward, an end of the nozzle being placed on substantially the same plane as that of an end of the nozzle receiving section, and a protruding part at a position of the core section facing the end of the nozzle that injects melted resin, wherein a gate of the resin injected into the cavity is cut by moving the core section forward and moving backward the nozzle receiving section and the nozzle pressed by the core section which has been moved forward so that the gate cutting causes a film of the resin to remain at the ends of the nozzle receiving section and the nozzle, and therefore the remaining resin can be used as part of the molding product to be molded in the next molding cycle. Therefore, when molding a molding product, it is possible to prevent the molded part not to be used as a product integrally molded with the molding product to be a product from being uselessly produced as a sprue, and thereby improve production efficiency.

The invention of the injection molding machine according to aspect 2 is the injection molding machine according to aspect 1, wherein the nozzle is provided with a heater. This allows the solidified, remaining film-shaped melted resin to be used as part of the molding product.

DESCRIPTION OF SYMBOLS

Figure 1:
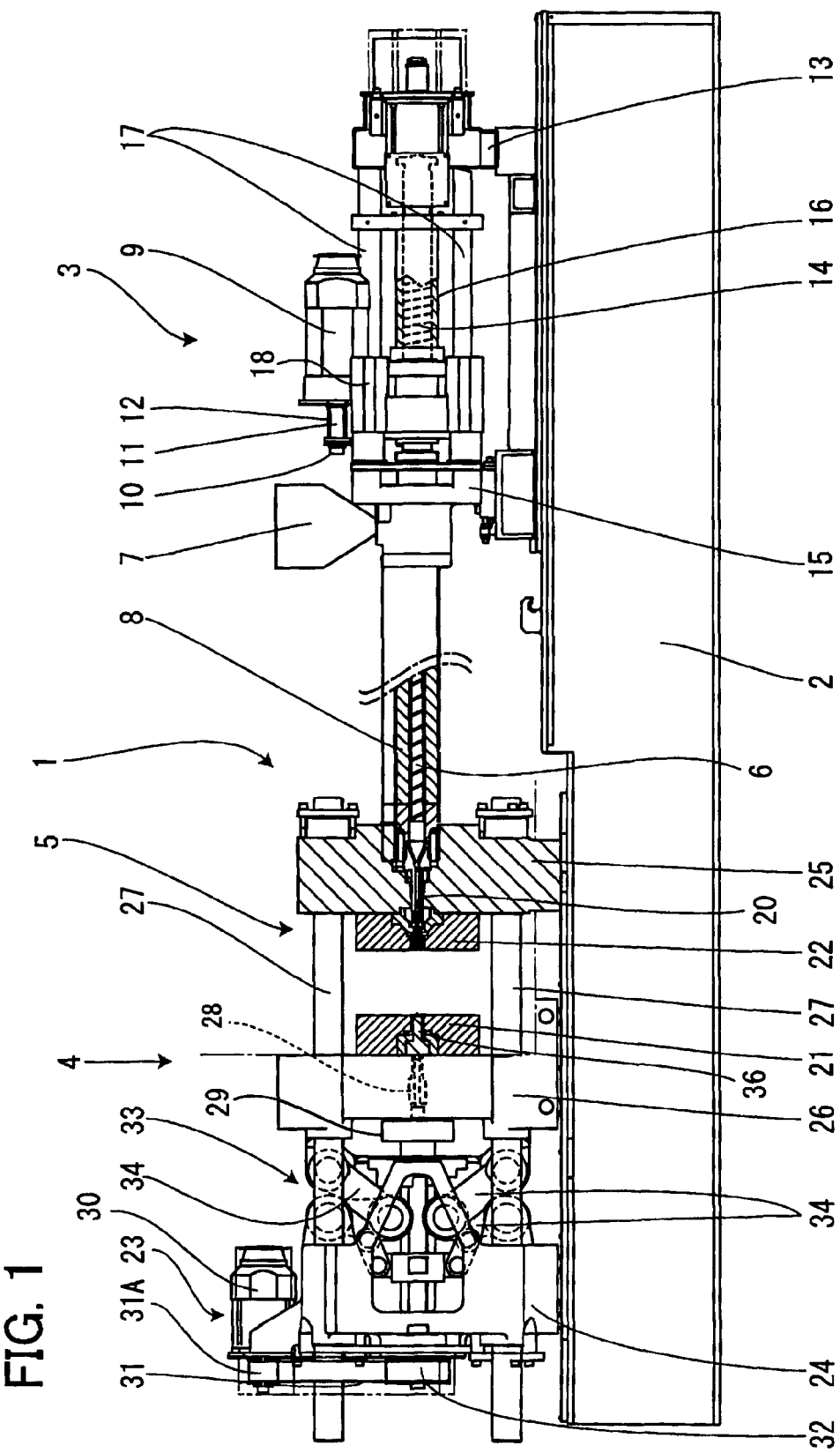
FIG. 1 is a partially cut out side view of a mold of an injection molding machine in a mold opening state showing an example of the present invention.

1 Injection molding machine
20 Nozzle
21 Movable mold
22 Fixed mold
36 Core section
37 Nozzle receiving section
38 Protruding part
C Cavity

BEST MODE FOR CARRYING OUT THE INVENTION

Hereinafter, an embodiment as the best mode for carrying out the present invention will be explained with reference to FIG. 1 to FIG. 6. It goes without saying that the present invention is also easily applicable to configurations other than that explained in the embodiment within a range without departing from the essence of the present invention.

FIG. 1 is a partially cut out side view of a mold of an injection molding machine in a mold opening state showing an example of the present invention, FIG. 2 to FIG. 6 are enlarged cross-sectional views of main parts of the mold configured on the injection molding machine. As shown in FIG. 1, the injection molding machine 1 includes a machine base 2 and an injection unit 3, a mold clamping unit 4 and a mold 5 are arranged on this machine base 2.

Explaining the configuration of the injection unit 3 in detail below, the injection unit 3 is designed to send out melted resin into a cavity C of a mold by rotating a screw 6 of this injection unit 3, there is a hopper 7 into which resin (pellet), which is a granular raw material, is deposited in the upper part of the injection unit 3 so that granular resin drops from the hopper 7 under its own weight into a cylindrical heating cylinder 8 provided below the hopper 7.

The injection unit 3 is intended to rotate the screw and measure the amount of melted resin supplied into the heating cylinder 8 and heated, is provided with a screw rotation drive motor 9, which is a drive source, and when a pulley 11 fixed to a rotating shaft 10 of this screw rotation drive motor 9 rotates the rear part of the screw 6 via a measuring drive timing belt 12 and thereby causes the screw 6 to rotate in conjunction therewith.

Furthermore, at the back of the injection unit 3 (right side in FIG. 1), an injection drive motor is fixed to a back side support frame 13 placed on the machine base 2, intended to rotate a ball screw section 14 configured in a ball screw unit, which will be described later, via a drive transmission mechanism made up of a pulley of the injection drive motor and an injection drive timing belt or the like, and a front side support frame 15 and the back side support frame 13 fixed onto the machine base 2 are connected together by cylindrical tie bars 17.

Explaining the ball screw unit here, a nut section configured in the ball screw unit holds the screw 6 in a rotatable manner and is attached to a screw holding plate 18 which is guided by the tie bars 17. Furthermore, the screw rotation drive motor 9 is fixed to the screw holding plate 18 and is designed to inject melted resin into the cavity C when the nut section 16 is moved forward by the injection drive motor and ball screw unit or on the other hand, plasticize/measure resin injected into the cavity C when the nut section 16 is moved backward.

Furthermore, the ball screw section 14 is intended to move the nut section 16 forward/backward by rotating the ball screw section 14 forward/backward, is pivotably supported by the back side support frame 13 and when the nut section 16 moving forward/backward in the axial direction (leftward/rightward direction shown in FIG. 1) of the ball screw section 14 moves, a steel ball repeatedly passes rolling through a groove (not shown) between this nut section 16 and ball screw section 14, and the nut section 16 thereby smoothly moves forward/backward with respect to the ball screw section 14.

Furthermore, the in-line screw 6 pivotably provided inside the heating cylinder 8, which is fixed to the front side support frame 15, is rotated by the screw rotation drive motor 9 as the drive source and the screw has not only the function of moving melted resin supplied between the screw 6 and heating cylinder 8 toward a nozzle 20 at the end of the screw 6 but also the function as a plunger to inject melted resin into the cavity C by moving forward. The nozzle 20 is provided with a heater and the rear of the nozzle 20 is fastened to the inner end inside the heating cylinder 8 with a screw and melted resin is supplied from the end of the nozzle 20 into the cavity C made up of a movable mold 21 and a fixed mold 22. Though not shown, the heater provided for the nozzle 20 is intended to prevent any temperature fall of melted resin in the nozzle 20 to be filled into the cavity C.

Next, the configuration of the mold clamping unit 4 configured in the above described injection molding machine will be explained. The mold clamping unit 4 is provided with a mold clamping drive apparatus 23 that moves the movable mold 21 forward/backward with respect to the fixed mold 22 to perform mold clamping (mold closing) or mold opening and provided with an ejection drive apparatus (not shown) that pushes and removes a molding product stuck inside the movable mold 21 during mold opening of the mold.

Furthermore, the mold clamping unit 4 is provided with a tail stock 24, a fixed die plate 25 and a movable die plate 26 on the machine base 2, and the tail stock 24 and fixed die plate 25 fixed onto the machine base 2 are tied together by a plurality of cylindrical tie rods 27. The movable die plate 26 is mounted with a drive apparatus 29 that moves a core section, which will be described later, forward/backward by a ball screw mechanism 28.

Next, the mold clamping drive apparatus 23 will be explained below. Reference numeral 30 denotes a mold clamping motor, which is fixed at the top of the tail stock 24 and serves as a drive source that performs mold clamping of the movable mold 21 with respect to the fixed mold 22. In the mold clamping drive apparatus 23, a pulley 31 is pivotably attached to the mold clamping motor 30, the mold clamping motor 30 rotates the pulley 32 pivotably supported by the tail stock 24 via a mold clamping timing belt 31A and transmits a drive force to a toggle mechanism 33 via a drive transmission mechanism to transmit such a drive. Upon driving of the mold clamping motor 30, a link arm 34 made up of a plurality of arms configured in the toggle mechanism 33, which is retracted in a mold opening state (state shown in FIG. 1) rectilinearly stretches when mold closing is performed and thereby performs mold closing (mold clamping) of the movable mold 21 with respect to the fixed mold 22. When the movable mold 21 is changed from a mold closing state to a mold opening state, mold opening is performed by reversing the direction of rotation of the mold clamping motor 30 at the time of mold clamping.

Next, the mold 5 will be explained. As shown in FIG. 1, this mold 5 is provided with the movable mold 21 fixed to the movable die plate 26 and the fixed mold 22 fixed to the fixed die plate 25, and as the movable die plate 26 moves forward/backward, the movable mold 21 moves forward/backward with respect to the fixed mold 22 to perform mold opening or mold closing. Furthermore, as shown in FIG. 2, a nozzle insertion hole 35 is formed in substantially the center of the fixed mold 22 so that the end of the nozzle 20 can be fitted in.

Furthermore, the movable mold 21 incorporates a core section 36, which is moved forward/backward by the drive apparatus 29 making up the drive motor via the ball screw mechanism 28, and when this core section 36 moves forward and presses the end of a nozzle receiving section 37, which is interposed between the fixed mold 22 and the nozzle 20 and disposed so as to slightly protrude toward the movable mold 21, the nozzle receiving section 37 moves backward. Furthermore, a protruding part 38 is provided in the core section 36 so as to face the end of the nozzle 20 that injects melted resin.

Furthermore, an eject sleeve 42 for pushing and ejecting a molding product inside the mold is interposed between the core section 36 in which the protruding part 38 is integrally provided and the movable mold 21, and a stamper holder 39 for attaching a stamper is interposed between the nozzle receiving section 37 and the fixed mold 22.

Figure 2:
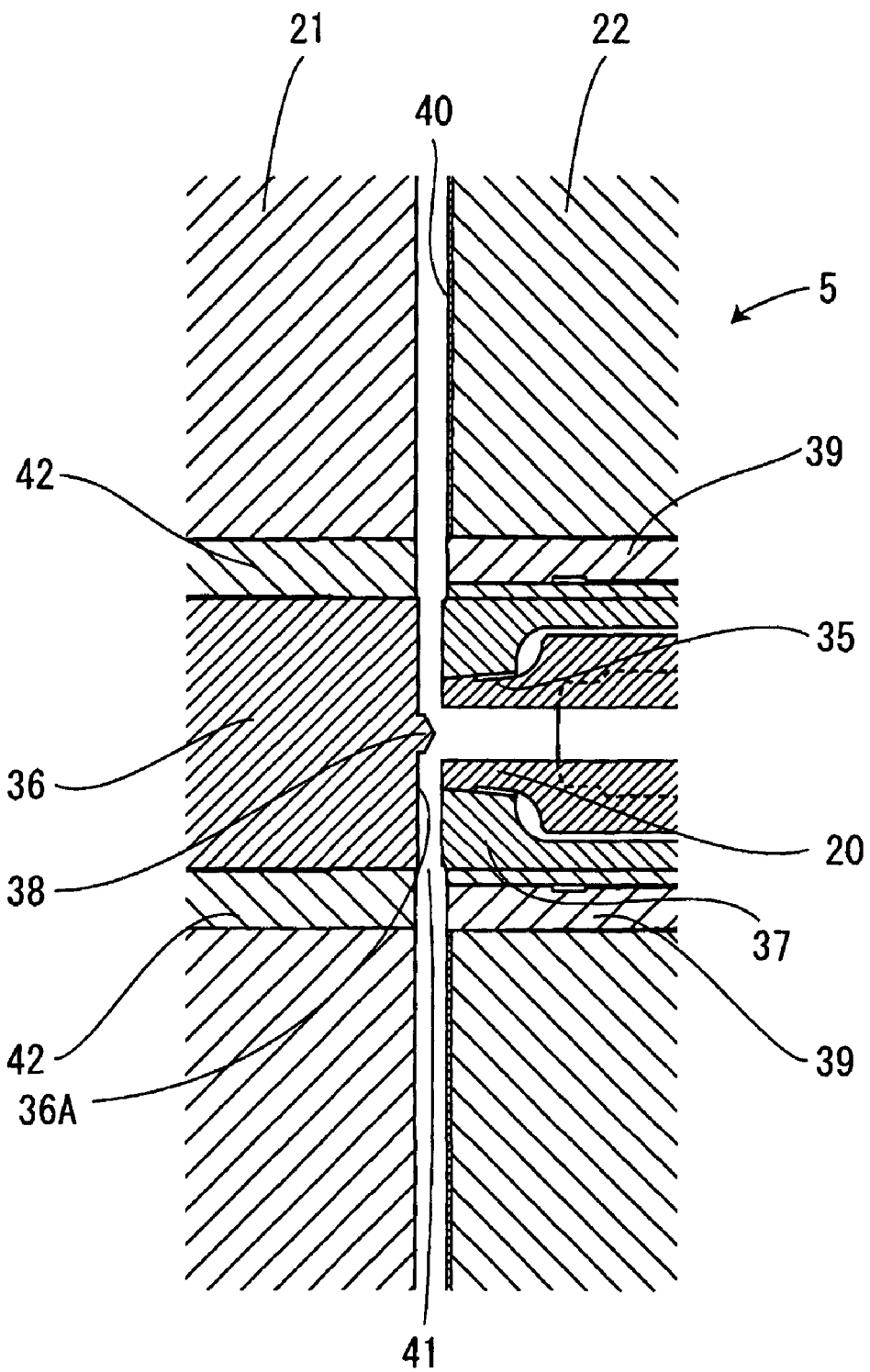
FIG. 2 is an enlarged cross-sectional view of main parts of a mold of the injection molding machine of the present invention.

The ends of the nozzle 20 and the nozzle receiving section 37 are arranged on substantially the same plane as that of a flat part (stamper) 40 that forms the cavity C in the fixed mold 22 as shown in FIG. 2 and more specifically, the ends of the nozzle 20 and the nozzle receiving section 37 slightly protrude toward the core section 36 from the flat part 40.

Next, the operation of the mold in the embodiment of the present invention will be explained based on FIG. 2 to FIG. 6. The operation sequence corresponds to the sequence of FIG. 2 to FIG. 6, and FIG. 3 shows a state in which melted resin is being filled into the cavity shown in FIG. 2, FIG. 4 shows a state in which mold clamping is performed with a predetermined amount of melted resin filled into the cavity, FIG. 5 shows a state in which the core section has moved forward and gate cutting is performed and FIG. 6 shows a state in which after completion of gate cutting, mold opening is performed on the mold.

Figure 3:
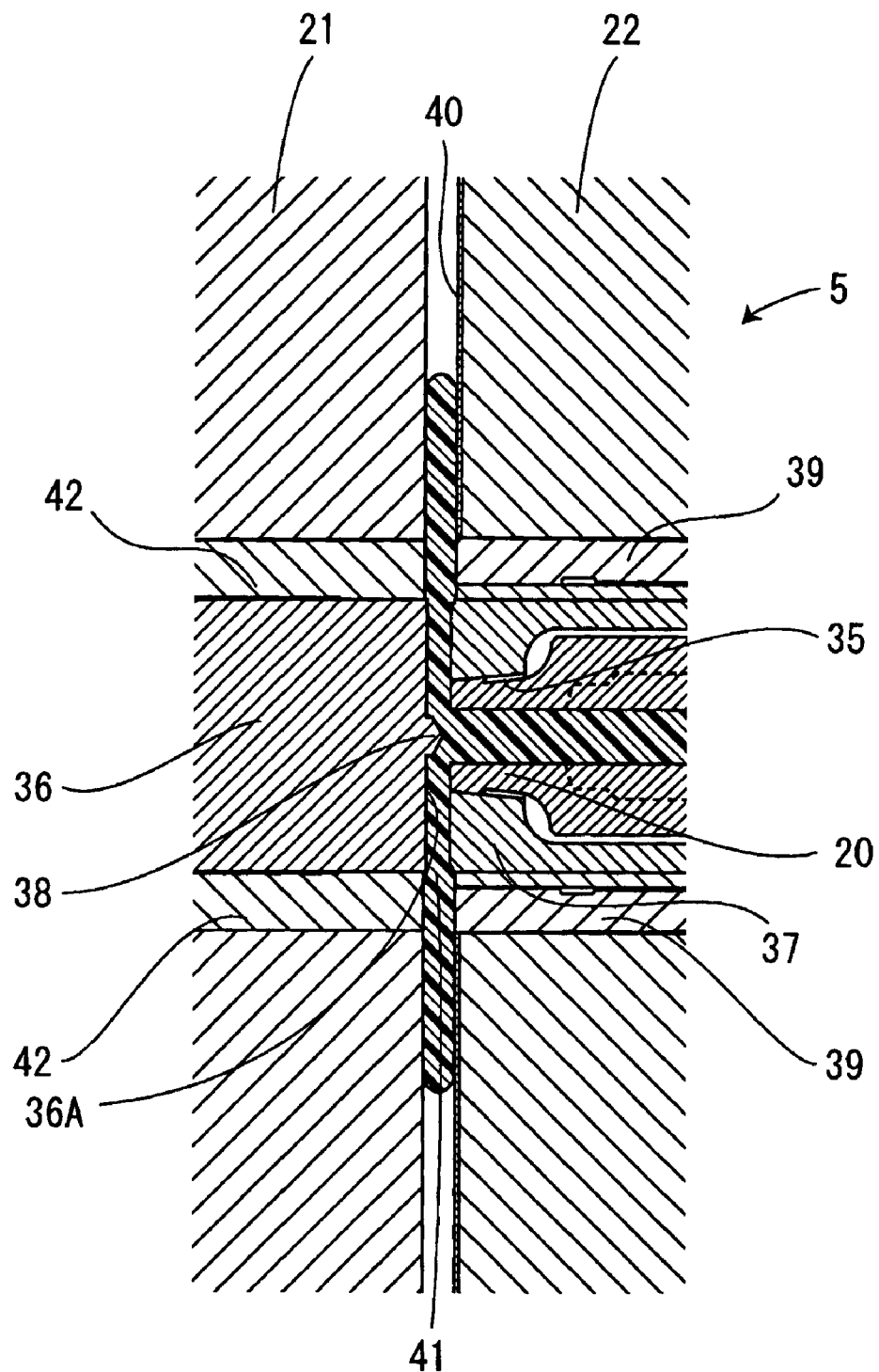
FIG. 3 is an enlarged cross-sectional view of main parts of the mold of the injection molding machine of the present invention showing a state in which the cavity is being filled with melted resin.
Figure 4:
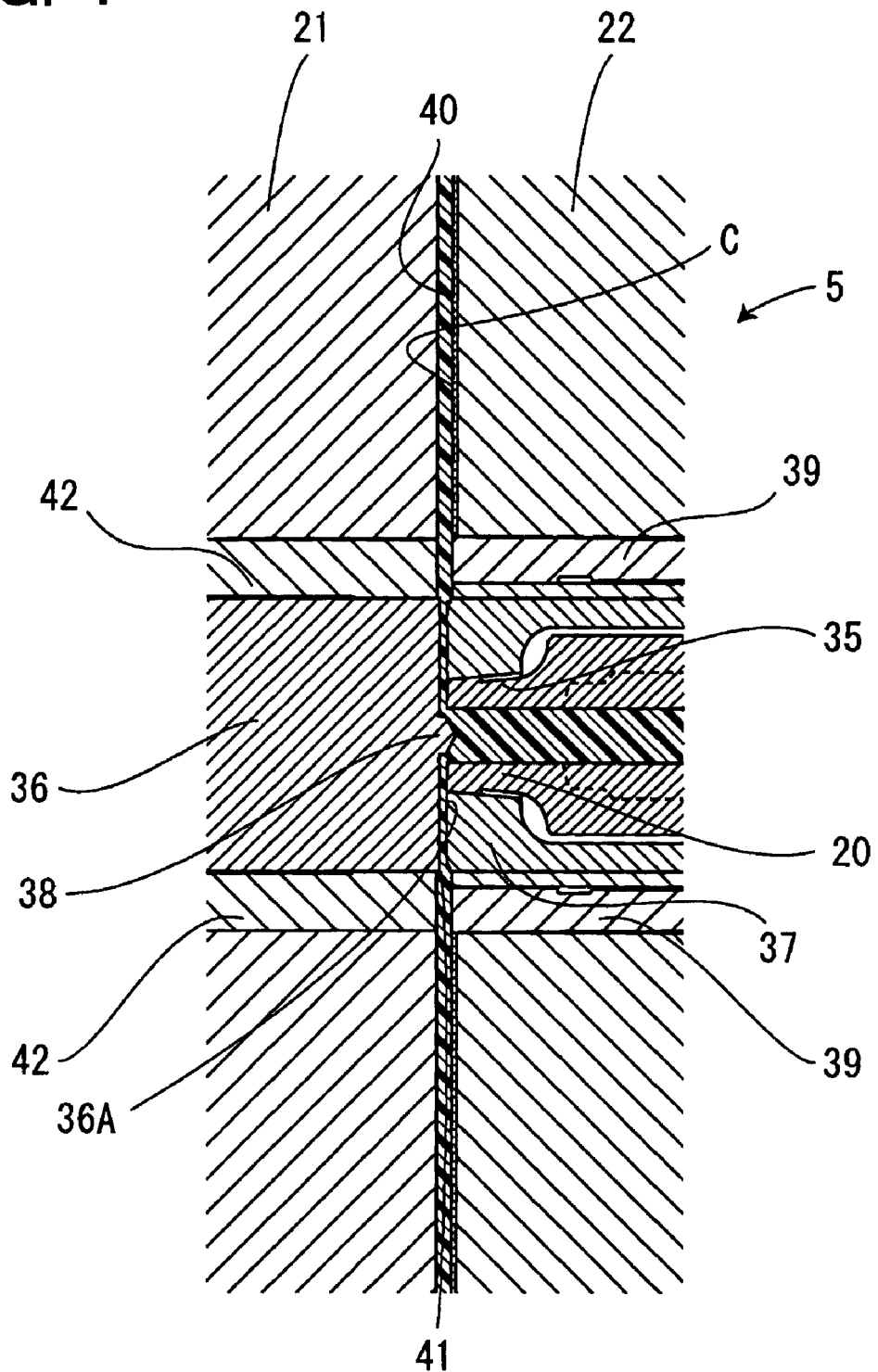
FIG. 4 is an enlarged cross-sectional view of main parts of the mold of the injection molding machine of the present invention showing a state in which mold clamping is performed with the cavity filled with a predetermined amount of melted resin.

As shown in FIG. 3, when melted resin injected from the nozzle 20 continues to be filled into the cavity C until a predetermined amount of melted resin is filled into the cavity C as shown in FIG. 4, the movable mold 21 is mold-clamped with respect to the fixed mold 22 substantially at the same time as this process. Next, driven by the drive apparatus 29, the core section 36 moves forward (rightward direction shown in FIG. 5) via the ball screw mechanism 28, and as shown in FIG. 5, as the core section 36 moves forward, the nozzle receiving section 37 and the nozzle 20 are pressed and move backward, whereby gate cutting is performed. As shown in FIG. 6, the movable mold 21 is mold-opened with respect to the fixed mold 22 and the molded molding product is ejected from the cavity C.

Figure 5:
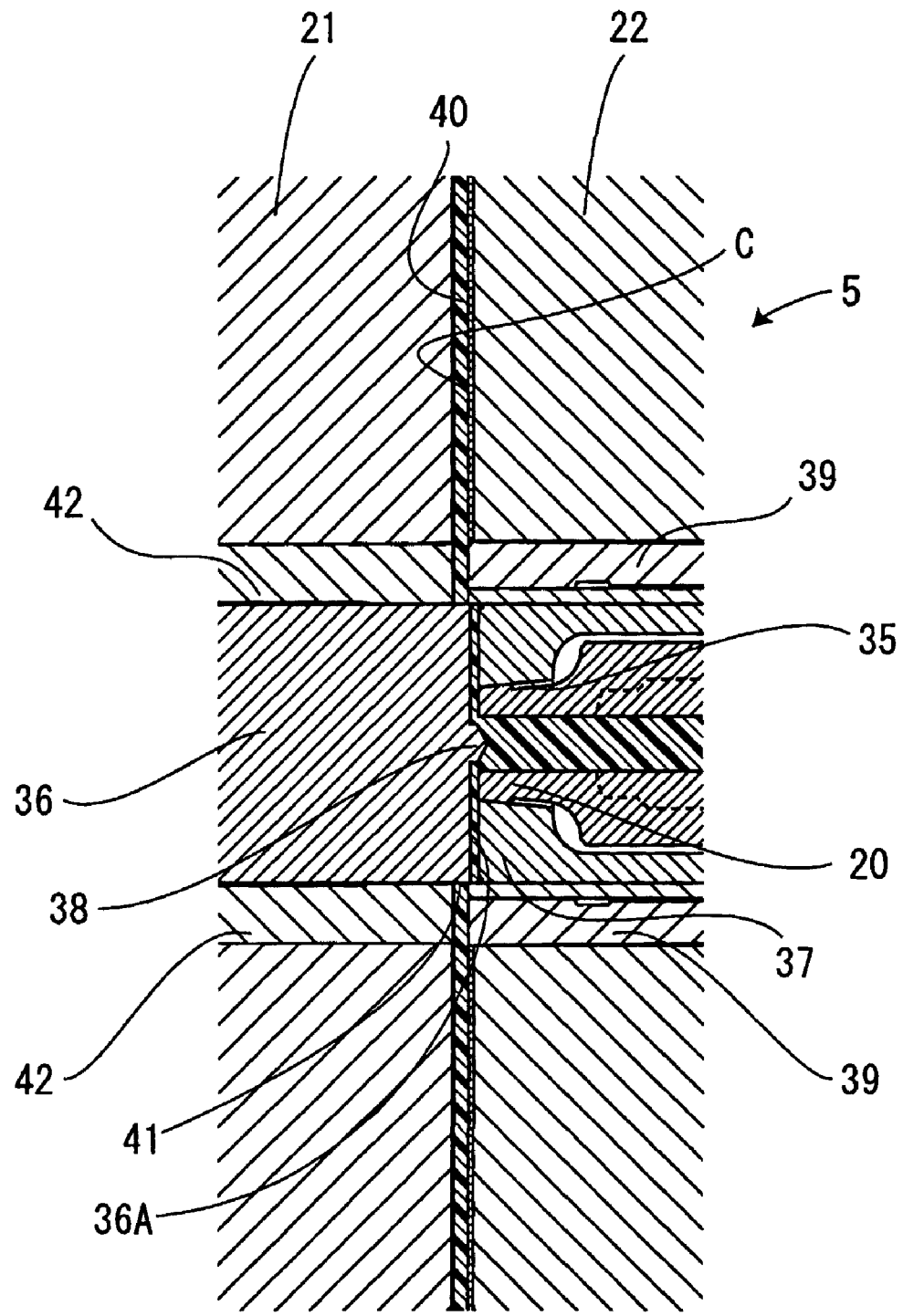
FIG. 5 is an enlarged cross-sectional view of main parts of the mold of the injection molding machine of the present invention showing a state in which the core section moves forward and gate cutting is performed.
Figure 6:
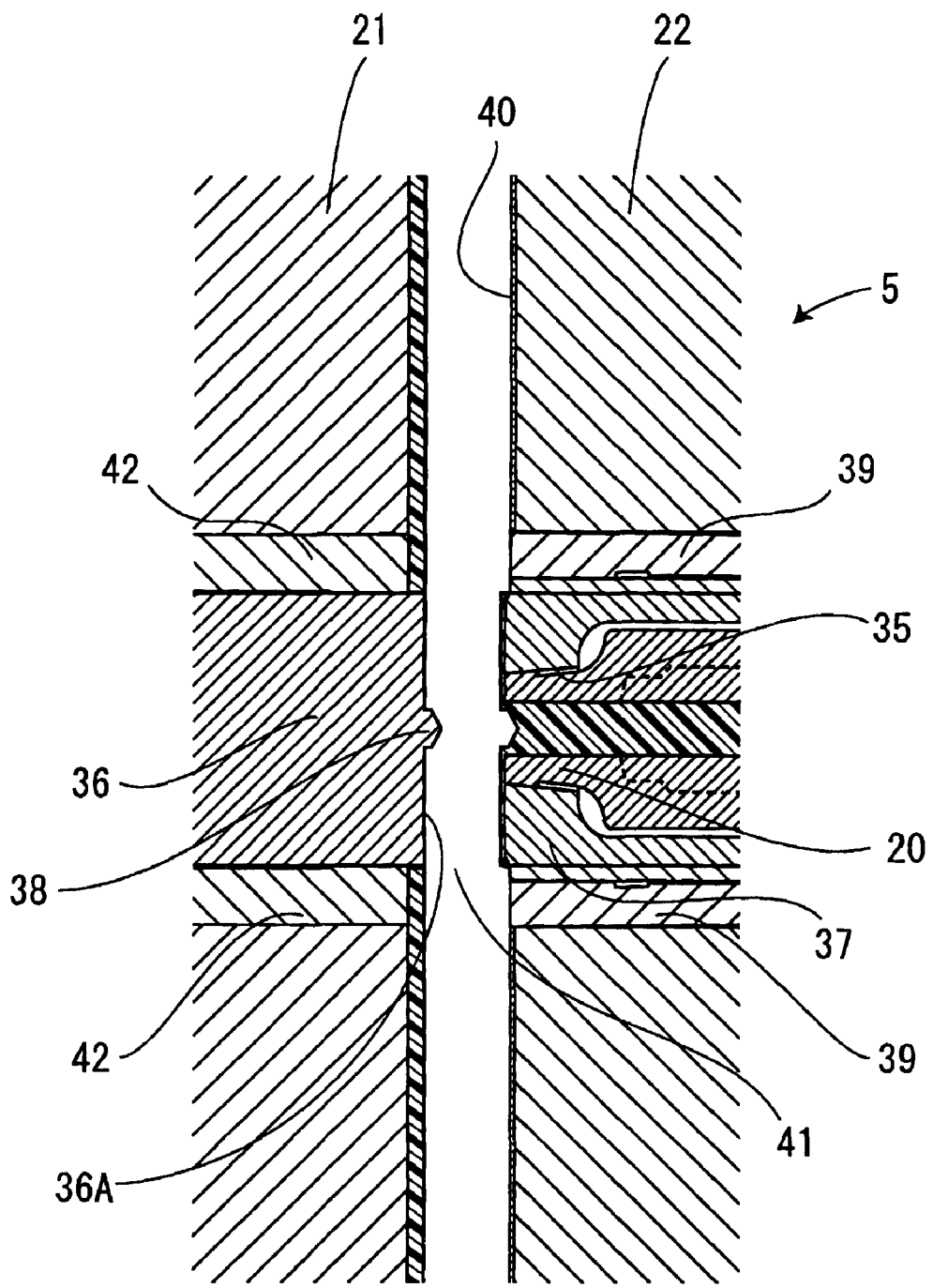
FIG. 6 is an enlarged cross-sectional view of main parts of the mold of the injection molding machine of the present invention showing a state in which the mold is opened after gate cutting.

At the time of gate cutting shown in FIG. 5, melted resin is compressed by the core section 36, and even when mold opening is performed as shown in FIG. 6, the gate-cut melted resin still remains as a film at the ends of the nozzle 20 and the nozzle receiving section 37 and this remaining melted resin is used as part of the molding product in the next molding cycle.

Here, the following three reasons (improvement of defective appearance due to cold slug, reduction of injection load, and improvement of gate) that the core section 36 is provided with the protruding part 38 will be explained.

Explaining improvement of defective appearance due to cold slug first, when cold slug is produced, cooled resin flows into the cavity C, which causes appearance defect of the molding product molded in the cavity C, but the provision of the protruding part 38 in the core section 36 so that the protruding part 38 enters the nozzle 20 at the end thereof can reduce cold slug remaining inside the nozzle 20 at the end thereof which is a cause of appearance defect. Explaining the reduction of injection load next, reducing cold slug remaining inside the nozzle 20 at the end thereof as in the case of the improvement of defective appearance due to cold slug can suppress molecular composition and birefringence of the molding product due to an increase of initial injection resistance (shearing stress of resin). Explaining the improvement of a gate 41 next, shutting the end of the nozzle 20 with the protruding part 38 as shown in FIG. 5 can suppress influences of inflow of melted resin supplied from the nozzle 20 on the screw 6 side and pressure propagation, reduce the amount of melted resin between the core section 36 and nozzle 20 before gate cutting, prevent cracking of the molding product due to remaining stress and the occurrence of micro cracks and cut burrs which may cause defective pasting of the molding product and consequently reduce the thickness of the remaining resin after gate cutting.

The injection molding machine 1 according to the present embodiment is configured such that the end of the nozzle receiving section 37 configured on the fixed mold 22 side of the cavity C formed of the fixed mold 22 and the movable mold 21 is made to slightly protrude toward the movable mold 21, the movable mold 21 is provided with the core section 36 facing the nozzle receiving section 37 in a manner movable forward/backward, the end of the nozzle 20 is disposed on substantially the same plane as that of the end of the nozzle receiving section 37, the protruding part 38 is provided at the position of the core section 36 facing the end of the nozzle 20 that injects melted resin, gate cutting of the resin injected into the cavity C is performed by moving the core section 36 forward and causing the nozzle receiving section 37 and nozzle 20 pressed by the core section 36 that has moved forward to move backward, and a film of resin is made to remain at the ends of the nozzle receiving section 37 and nozzle 20 through gate cutting. In this way, the melted resin injected from the nozzle 20 is filled from the gate 41 into the cavity C, and when the core section 36 moves forward next, the forward movement of this core section 36 causes the nozzle receiving section 37 and nozzle 20 to be pressed and move backward, gate cutting is performed, and the movable mold 21 then moves backward and mold opening is performed. In this case, resin existing between the core section 36, nozzle receiving section 37 and nozzle 20 is cooled and solidified and united with resin filling the interior of the nozzle 20, thereby remains in a film-shape at the ends of the nozzle receiving section 37 and nozzle 20, and therefore by melting the remaining resin with heat of melted resin supplied from the nozzle 20 at the time of filling resin into the cavity C in the next cycle and using the melted resin as resin to be filled into the cavity C, it is possible to use the resin as part of a molding product to be molded in the next molding cycle. Therefore, it is possible to use remaining resin as part of the molding product to be molded in the next molding cycle, and when, for example, molding a flat molding product of a small thickness such as a recording medium (compact disk and video disk) in which data such as music and video is recorded, it is possible to prevent a molded part not to be used as a product integrally molded together with the molding product to be a product from being uselessly produced as a sprue and thereby improve the production efficiency and suppress manufacturing cost. Furthermore, since the protruding part 38 is provided at the position of the core section 36 facing the end of the nozzle 20 that injects melted resin, by disposing the protruding part 38 so as to enter the nozzle 20 at the end thereof, it is possible to reduce cold slug remaining inside the nozzle 20 at the end thereof, which may cause appearance defects and adjust the film thickness of resin remaining at the ends of the nozzle receiving section 37 and the nozzle 20 to a predetermined thickness. Therefore, since resin can be made to remain in the nozzle receiving section 37 and nozzle 20 as a thin film, it is possible to prevent a variation in the thickness of the remaining resin layer from adversely influencing quality of the molding product as in the related art.

Furthermore, since the nozzle 20 is provided with a heater, when cooled, solidified remaining film-shaped resin is filled into the cavity C, by heating and melting the film-shaped melted resin using the heater provided for the nozzle 20, it is possible to smoothly fill the film-shaped resin together with the melted resin supplied through injection from the nozzle 20 into the cavity C. Therefore, the remaining film-shaped resin can be used as part of the molding product.

An embodiment of the present invention has been described in detail so far, but the present invention is not limited to the present embodiment, and can be modified in various ways within the range of the essence of the present invention. The present embodiment has shown an example where a toggle mechanism is used as the mechanism for moving the movable mold with respect to the fixed mold, but the present invention is not particularly limited to this and the present invention is also applicable to a straight hydraulic mold clamping/mold opening apparatus using an electric motor or hydraulic apparatus instead.

The invention claimed is:

1. An injection molding machine comprising:
a nozzle receiving section configured on a fixed metal mold side of a cavity formed of the fixed metal mold and a movable metal mold so as to slightly protrude toward the movable metal mold,
a core section facing the nozzle receiving section provided in the movable metal mold in a manner movable forward/backward, an end of the nozzle being placed on substantially the same plane as that of an end of the nozzle receiving section; and
a protruding part provided at a position of the core section facing the end of the nozzle that injects melted resin,
wherein a gate of the resin injected into the cavity is cut by moving the core section forward and moving backward the nozzle receiving section and the nozzle pressed by the core section which has been moved forward so that the gate cutting causes a film of the resin to remain at the ends of the nozzle receiving section and the nozzle.

2. The injection molding machine according to claim 1, wherein the nozzle comprises a heater.

* * * * *